3,352,644
ANALYSIS OF HYDROGEN
Ihor Lysyj, Canoga Park, Calif., assignor to
North American Aviation, Inc.
Filed Sept. 18, 1964, Ser. No. 397,542
4 Claims. (Cl. 23—232)

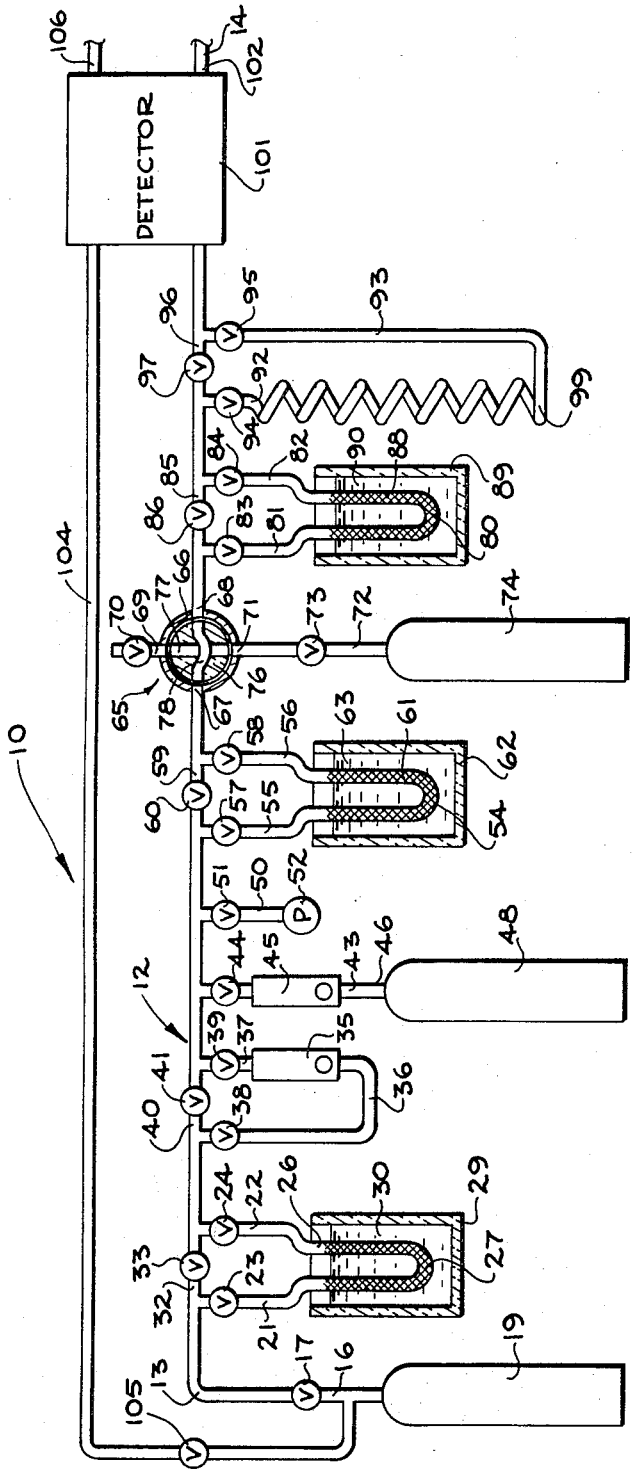

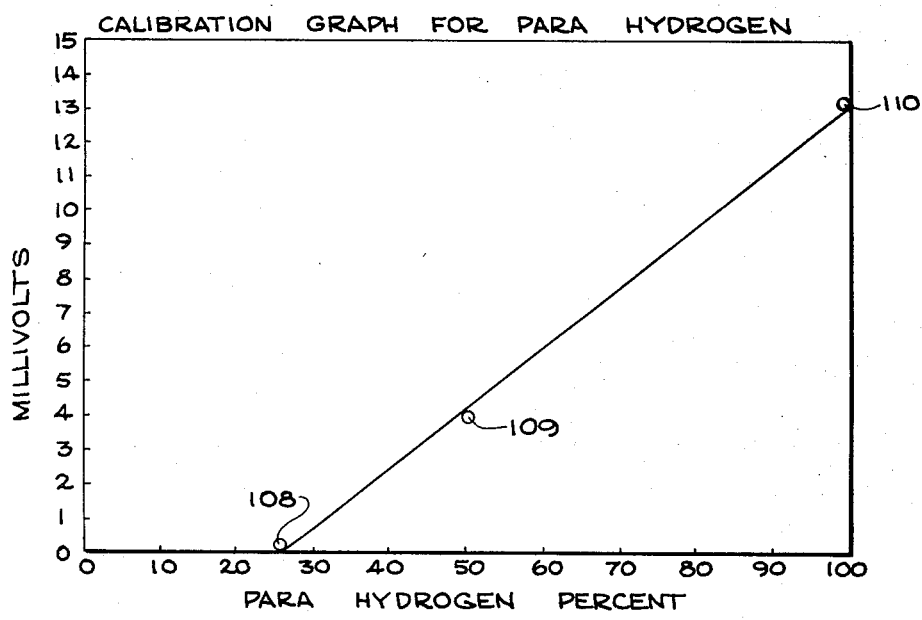
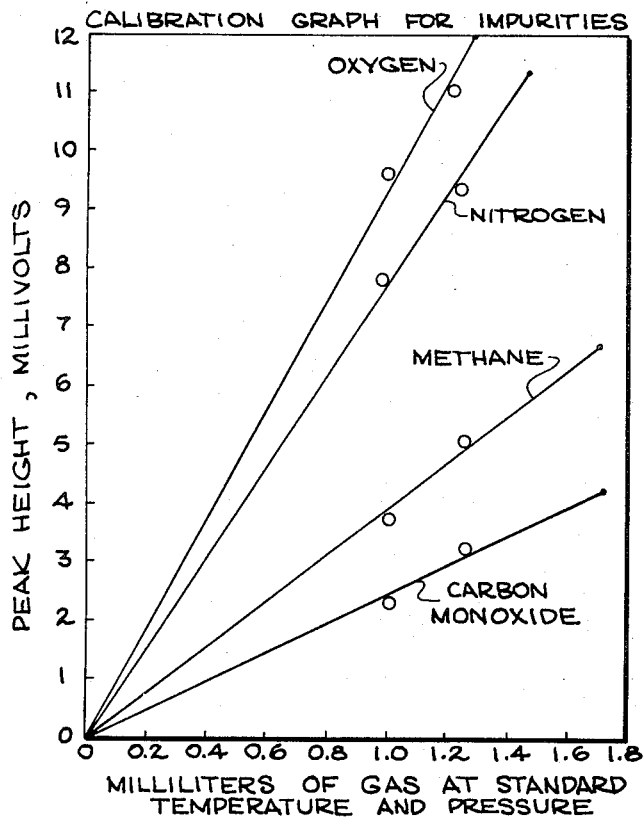

ABSTRACT OF THE DISCLOSURE

Method and apparatus for analysis of hydrogen involving trapping of impurities from a sample stream of hydrogen, purifying an upstream portion of the stream, and using the purified portion to remove the trapped impurities and to carry them to a chromatographic column and detector.

---

This invention relates to analysis of hydrogen for determination of its ortho-para ratio and for determination of trace amounts of impurities. The invention described herein was made in the performance of work under a NASA contract and is subject to the provisions of the National Aeronautics and Space Act of 1958, Public Law 85–568 (72 Stat. 426; 42 U.S.C. 2451), as amended.

Molecular hydrogen appears in two isomeric forms, in equilibrium, i.e., ortho and para. They exhibit slight differences in physical properties, e.g., boiling point, heat capacity, and thermoconductivity. The equilibrium point of respective concentrations of the two isomers is a function of temperature. Thus, at the normal boiling point of hydrogen (−252.77° C.) the composition of hydrogen at equilibrium is 99.79% para and 0.21% ortho; at the boiling point of liquid nitrogen the equilibrium point is about 50% for each isomer; and at room temperature the equilibrium point is at 25% para and 75% ortho. In the absence of specific catalysts, the equilibration of the ortho-para system is relatively slow. Conversion from the ortho to the para form of the hydrogen molecule involves an exothermic reaction. As conversion occurs in liquid hydrogen, the heat released appears as latent heat of vaporization causing substantial loss of hydrogen in storage. It is important, then, to determine the ortho-para ratio of a volume of liquid hydrogen to be stored for the purpose of deciding, prior to passing the hydrogen to storage, whether or not the hydrogen should be treated with a catalyst for converting its ortho isomer to its para isomer.

It is a general object of this invention to provide simple and reliable apparatus and method for analyzing hydrogen to determine its ortho-para isomer ratio.

The ortho-para isomer ratio of pure hydrogen has been determined heretofore by direct thermoconductivity measurement; however, the presence of trace amounts of impurities (e.g., $N_2$, $O_2$, CO, and $CH_4$) substantially changes the indicated thermoconductivity of hydrogen. The apparatus and method of this invention provide not only for the determination of the ortho-para isomer ratio of hydrogen but also provide improved and relatively simple means and procedure for determination of the level of impurities in the parts-per-million range.

Further objects and advantages of this invention will appear in the following part of this description, wherein the details of construction and mode of operation of an embodiment of the apparatus of this invention are described with reference to the accompanying drawing in which:

FIG. 1 is a diagrammatic representation of an apparatus of this invention;

FIG. 2 is a calibration graph from which measurements indicated by the apparatus may be translated into values of concentrations of the para isomer in a sample of hydrogen being analyzed; and FIG. 3 is a calibration graph from which measurements indicated by the apparatus may be translated into values of concentrations of impurities in the sample of hydrogen being analyzed.

In FIG. 1 of the drawing, the illustrated apparatus is designated generally by reference numeral 10. It comprises a main flow line 12 having an upstream end 13 and a downstream end 14. A branch line 16 with a valve 17 is connected to the upstream end of the flow line 12 and is adapted for connection to a supply cylinder 19 containing hydrogen of known concentrations of para and ortho isomers. Two branch lines 21 and 22, with valves 23 and 24 respectively, extend from the main flow line 12 to the legs, respectively, of a U-tube trap 26 containing a conventional catalyst 27, e.g., hydrous ferric oxide, for converting the ortho isomer of hydrogen to its para isomer. The trap 26 is disposed to extend into a Dewar flask 29 containing a cryogenic bath 30. The branch lines 21 and 22 for the trap 26 are separated at their points of connection with the main flow line 12 by a bypass section 32 of the main flow line. The bypass section 32 contains a valve 33. Downstream of the U-tube trap is flowmeter 35 which is connected to the main flow line 12 by branch lines 36 and 37 equipped with valves 38 and 39 respectively. A bypass section 40 with a valve 41, spans the points of connection of the lines 36 and 37 with the main flow line.

For introducing hydrogen to be analyzed, there is a branch line 43 containing a valve 44 and a flowmeter 45. The inlet end 46 of the branch line 43 is adapted to be connected to a supply cylinder 48 containing hydrogen to be analyzed. Following the inlet line 43 is a tap 50 containing a valve 51 and a pressure gauge 52.

A second U-tube trap 54 is connected to the main flow line 12 by branch lines 55 and 56, equipped with valves 57 and 58, respectively, and separated along the main flow line 12 by a bypass section 59 having a valve 60. The second trap 54 contains an adsorbent 61 for removing impurities from hydrogen and for retaining the impurities in the trap. Examples of conventional adsorbents for this purpose are silica gel, alumina, and activated charcoal. A Dewar flask 62 containing a cryogenic bath 63 provides for cooling of the trap 54.

Downstream of the second trap 54 is a metering valve 65, the housing 66 of which contains an inlet 67 and outlet 68 opening in the main flow line 12, and a vent 69 with a valve 70, and an inlet 71 for connection by a line 72 with valve 73 to a supply cylinder 74 containing a known mixture of impurities, e.g., $N_2$, $O_2$, CO, and $CH_4$. The metering valve 65 comprises a valve body 76 having two separate passageways 77 and 78 of different capacities, e.g., passageway 77 may have a volume of 4 cc. while passageway 78 may have a volume of 5 cc. The valve body 76 permits adjustment for each of the passageways in a first position aligned with the inlet 71 and vent 69 for filling the passageway with a known volume of gas from the cylinder 74 of impurities, and in a second position aligned with the inlet 67 and outlet 68 for admitting the known volume of gas into the main flow line 12.

A third U-tube trap 80 is connected to the main flow line 12 by branch lines 81 and 82, having valves 83 and 84 respectively, the branch lines being spaced apart at their connections to the main flow line 12 by a bypass section 85 equipped with a valve 86. The third trap 80 contains an adsorbent 88 similar to the adsorbent 61 of the second U-tube trap 54. A removable Dewar flask 89 containing a cryogenic bath 90 serves to cool the trap 80. Two branch lines 92 and 93, equipped with valves 94 and 95 respectively, and separated at their connections with the main flow line 12 by a bypass section 96 with a valve 97, are connected to the ends respectively of a gas chromatographic column 99 filled with a conventional adsorbent, e.g., alumina-silica zeolites, such as that marketed by Linde Air Products Co., New York, N.Y., under the name "Molecular Sieves–5A."

From the gas chromatographic column 99, the flow line 12 leads to a conventional thermoconductivity detector 101. The analyzed gas passes from the sample side in the detector 101 through a vent 102 to the atmosphere. For a supply of a reference gas for the detector 101, there is a flow line 104 provided with a valve 105, leading from the branch line 16 for passing hydrogen of known concentrations of ortho and para isomers, to the reference side in the detector 101. The reference gas is exhausted from the detector through vent 106.

*Calibration for determining ortho-para ratio*

To establish a base line point 108 for the graph of FIG. 2 in calibrating the apparatus 10 with respect to its ortho-para isomeric ratio of hydrogen, the valves of the apparatus are adjusted to permit flow of normal (25% para, 75% ortho) hydrogen from the cylinder 19 through the second U-tube trap 54 for adsorption of impurities, and thence directly to the detector 101. The valve 105 in the reference line 104 is maintained in open position to allow flow of hydrogen from the cylinder 19 continuously through the reference side in the detector 101. The measurement indicated by the recorder of the thermoconductivity detector 101 is then plotted as point 108 for the graph of FIG. 2, as representing a concentration of 25 percent of the para isomer in hydrogen.

For establishing a second point 109 for the calibration graph of FIG. 2, the Dewar flask 29 is filled with liquid nitrogen, valves 23 and 24 are opened and the bypass valve 33 is closed to cause flow of hydrogen from the cylinder 19 through the first trap 26, thence through the second trap 54 and thence through the thermoconductivity detector 101. The catalyst trap 26, being maintained at a temperature equal to the boiling point of liquid nitrogen, causes conversion of the ortho-para isomer to an extent of equilibrium at about 50 percent for each isomer. The difference in millivolts between the thermoconductivity of hydrogen of 50 percent para concentration and the thermoconductivity of hydrogen of 25 percent para concentration determines the location for the point 109. To establish a third point 110 for the calibration graph of FIG. 2, the catalyst trap 26 is cooled by filling the Dewar flask 29 with liquid hydrogen thereby to convert the ortho isomer in the hydrogen from cylinder 19 to a total para concentration of 99.97 percent.

*Calibration for concentrations of impurities*

FIG. 3 is a calibration graph for the apparatus 10 for reference in determining the concentrations of various impurities in a sample of hydrogen gas being analyzed. In the graph of FIG. 3 relative thermoconductivity responses for the several impurities most like to be present in a sample of hydrogen, e.g., $N_2$, $O_2$, CO, and $CH_4$, are plotted against respective volumes. To determine the abscissa locations (i.e., relative thermoconductivity responses in millivolts) for the first set of four points for the graph of FIG. 3 at a volume of 1.0 milliliter for each impurity, a cylinder 74 containing a mixture of equal volumes of nitrogen, oxygen, carbon monoxide, and methane is connected to the inlet 71 of metering valve 65, and the valve body is adjusted to align the passageway 77 (of 4 cc. capacity) with the inlet 71 and vent 69 to fill the passageway 77 with the mixture of impurity gases at standard temperature and pressure. The valve 65 is then adjusted to align the filled passageway 77 with the valve openings 67 and 68 whereby purified hydrogen gas from the cylinder 19 at a constant rate, e.g., 50 ml./min., for a predetermined time, e.g., 10 min., carries the charge of impurity gases from the passageway 77 into the gas chromatographic column 90 where the impurities are adsorbed and separated in the column and then released after respective retention times. As is well known to those familiar with the operation of a gas chromatographic column, continuous flow of purified hydrogen through the column causes the several impurity gases, temporarily retained in the column, to be released successively and to pass into the detecting side of the detector 101. The recorder of the detector indicates successive peak readings in millivolts as each of the impurity gases passes through the detector. It is apparent, of course, that instead of using a known mixture of impurities for calibration purposes, separate runs may be made with charges in the metering valve 65 of pure specimens of the respective impurities.

For establishing a second set of points, at 1.25 ml. volume, for each line on the calibration graph of FIG. 3, the metering valve 65 is adjusted to fill its passageway 78 (of 5 cc. capacity) with the mixture of impurity gases from the cylinder 74 and then to pass the 5 cc. charge through the gas chromatographic column 99 and thence through the detector.

*Analysis for unknown concentrations of para isomer and impurities*

With the calibration graphs of FIGS. 2 and 3 being drawn, one may proceed to analyze hydrogen from cylinder 48 for determination of its ortho-para isomer ratio and for determination of the respective concentrations of its several impurities. With the Dewar flask 89 for the third trap 80 being filled with a cryogenic bath, e.g., liquid nitrogen, the valves of the apparatus 10 are adjusted to pass hydrogen from the cylinder 48 through the flowmeter 45 at the same rate as was employed for calibrating the apparatus, and thence directly through the cooled trap 80 where the impurities thereof are adsorbed, and thence to the detecting side of the detector 101 which indicates the relative thermoconductivity response thereof in millivolts. By referring to the calibration graph of FIG. 2, the reading millivolts on the detector for the hydrogen being analyzed is translated into units of percent concentration of the para isomer.

To next determine the concentration of impurities in the hydrogen being analyzed, the Dewar flask 89 is removed from the third trap 80, thereby allowing the trap to warm to room temperature. The valves of the apparatus are then adjusted to pass hydrogen gas from the cylinder 19 at the same rate as was employed for calibrating the apparatus, through the second trap 61 to remove impurities from the carrier hydrogen gas, and thence through the third trap 80 where the carrier hydrogen gas sweeps the impurities from the trap and into the gas chromatographic column 99 from which the impurities are sequentially released for passing successively through the detector 101. The readings of peak intensities for the respective gases are then translated into units of volume by reference to the graph of FIG. 3. The known volumes of the impurity gases may then be arithmetically converted into units of concentration in the known volume at standard temperature and pressure of the sample hydrogen gas initially passed from the cylinder 48.

In view of the foregoing description, it is apparent that by this invention even exceedingly minute traces of impurities in hydrogen may be accurately determined, because the invention is not limited to analysis of a fixed volume of hydrogen but instead permits employment of whatever volume of hydrogen gas is appropriate in order to accumulate a sufficient quantity of an impurity for measurement with a conventional thermoconductivity detector.

It will be understood that it is intended to cover all changes and modifications of the embodiment of the invention herein chosen for purposes of illustration which do not constitute departures from the spirit and scope of the invention.

Having described the invention, what is claimed is:

1. A method for determining the respective concentrations of impurities in a sample source of hydrogen comprising the steps of:

passing an impure sample stream from a sample source of hydrogen at a known volume rate into a trap for a known period of time; thereby trapping impurities from the stream in the trap;

purifying an upstream portion of the stream of said sample hydrogen, subsequently passing the thus purified upstream portion from the sample hydrogen source at a known volume rate through the trap for use as a carrier gas to pick up the impurities contained in the trap; and passing said purified stream now laden with impurities from the trap into a calibrated chromatographic column and detector to;

thereby analyze the hydrogen sample for impurities.

2. An apparatus for analyzing a sample of hydrogen to determine respective concentrations of impurities, the apparatus comprising a main flow line having upstream and downstream ends and having the following parts selectively connectable for flow communication with said line in an upstream to downstream order:

(a) means for containing a supply of hydrogen to be analyzed;
(b) means for adsorbing impurities from said hydrogen gas to purify it for use as a carrier gas;
(c) means for containing known impurity gases for calibrating the apparatus;
(d) means for releasably adsorbing impurities from said hydrogen gas;
(e) a gas chromatographic apparatus;

said flow line having a metering device operatively associated therewith between means (c) and (d) for introducing charges of various known volumes of said impurity gases from part (c) for calibration purposes; and, means for measuring rates of flow of gas through said flow line from (a).

3. The apparatus of claim 2 including means associated with parts (b) and (d) for maintaining said parts at various selected temperatures.

4. The apparatus of claim 2 wherein part (c) is a cylinder containing a mixture of known concentrations of nitrogen, oxygen, carbon monoxide, and methane.

References Cited

UNITED STATES PATENTS 3,116,115  12/1963  Kasparian et al. _____ 23—210

OTHER REFERENCES

N. H. Ray, Nature, pp. 403–405 (Aug. 31, 1957).

Bachmann et al.: J. of Catalysts, vol. 1, pp. 113–120, May 1962.

JOSEPH SCOVRONEK, *Acting Primary Examiner.*

MORRIS O. WOLK, *Examiner.*

L. MEI, *Assistant Examiner.*